Sept. 14, 1965    H. KORTHAUS ETAL    3,206,628
LINEAR OUTPUT ROTARY MOTOR ASSEMBLY
Filed March 5, 1963    2 Sheets-Sheet 1

INVENTORS:
Helmut Korthaus
Richard Wilke
By Ennest J Montague
Attorney

INVENTORS:
Helmut Korthaus
Richard Wilke

United States Patent Office 3,206,628
Patented Sept. 14, 1965

3,206,628
LINEAR OUTPUT ROTARY MOTOR ASSEMBLY
Helmut Korthaus, Fernblick 3, Wuppertal-Barmen, Germany, and Richard Wilke, Eschfeldstrasse 11, Gelsenkirchen, Buer, Germany
Filed Mar. 5, 1963, Ser. No. 263,056
Claims priority, application Germany, Mar. 8, 1962,
K 46,117
22 Claims. (Cl. 310—75)

The present invention relates to an electromotive adjusting device, in which the rotary movement of a rotor of an electric motor drivable in a predetermined direction is transformed into an axial linear pushing or pulling movement of a spindle-adjustment rod, which is secured against rotation, which spindle-adjustment rod cooperates with a spindle nut operated by the electric motor, as well as with a magnetic brake working on the spindle nut.

It is already known, in connection with electric motors for the production of linearly pushing and pulling movements, to achieve the pushing and pulling linear movement in such manner, that the roto of the electric motor has instead of the conventional motor axle a hollow shaft formed as a spindle nut. The spindle extending through the spindle nut is formed as a smooth rod on both sides of the spindle thread. In order to bring about the linear pushing or pulling movement of this spindle, one end of the smooth spindle rod is equipped with a longitudinal groove, in which a guide key slides, which is rigidly connected with a guide bushing guiding this end of the rod along an opening in the housing of the electric motor.

It is further known to mount the rotor together with the spindle nut in the housing for longitudinal movement and to retain the rotor in its center position by means of spring assemblies disposed on both sides of the rotor. If the counter-force surpasses the pulling or pushing force of the spindle, then the spindle nut is displaced in the housing in the direction of the retaining force and the corresponding spring assembly is compressed. Simultaneously, the spindle nut displacing itself in longitudinal direction, operates a pair of contacts, which are opened and, thereby, switches off the current to the motor by means of a corresponding motor relay, so that the motor ceases its operation.

These known devices have the drawback, however, that the spring assemblies, which determine the highest pressure with which the spindle can exert pressure, lose their force after a time period, so that a maximum exertable pressure cannot be secured for a very long time period. In addition to this fatigue of the spring assemblies, the danger of spring breaks and, thereby, disturbances in this device also exist. It is of course possible, to make the springs adjustable. This means, however, that the springs must be disposed inside of the housing, that they are difficultly accessible and that always, for the readjustment of the spring forces, the spring assemblies must be accessible.

In the known arrangement, furthermore, the length of the path of the spindle thread, which is equipped with an abutment, is limited. If the spindle moves up to this abutment position, the corresponding spring assembly is compressed and the motor is switched off. Simultaneously, a mechanical brake is arranged, which is supposed to retain the motor with its spindle nut in this end position, in order to prevent a return movement of the nut on the spindle, which is now retained in the end position. It is a drawback in connection with this mechanical brake arrangement, that a brake effect is achieved only as long as a brake pressure is present. This brake pressure ceases, however, at the moment, in which the rotor does not exert any torque any more by the switched-off motor, and in which the rotor has come to a stand still. It is, thus, possible upon corresponding large counter pressure and sufficiently low friction between the spindle nut and the spindle nut-rotor, respectively, and the spindle rod, that the rotor is subjected to a rotation in opposite direction by this counter-pressure, and the spindle rod is returned again into the housing by this counter-pressure; this must be avoided, however.

It is a further drawback, that the brake cannot become effective at all, if the motor is switched off arbitrarily during the displacement movement, as long as the counter-pressure is not higher than the maximum pressure deliverable from the device; and this is the normal situation. It is, thus, though possible, to stop the movement of the spindle intermediate its path in the device known before; it is not possible, however, to secure immovably the spindle in this position, that means, at the moment of switching off of the motor, because an effective brake, which prevents a rotation of the rotor with its spindle nut on the spindle, is not present.

In addition, the conventional arrangement of the rotor has the drawback, that the heat created by the friction between the spindle nut and the spindle is fed directly into the sheets of the rotor, and, thereby, leads to an undesirable additional heating of the entire motor. This additional heat fed directly over the rotor to the motor, reduces the switching frequency permissible for the motor and limits, thus, the frequency of the working cycles of the entire device in an undesirable manner.

It is, therefore, one object of the present invention, to provide an electromotive adjusting device, which lacks the described drawbacks and which complies with the set requirements.

It is another object of the present invention to provide an electromotive adjusting device, which complies with the desire arising from the practical operation of the devices, to make adjustable the performed pushing or pulling forces, and to accommodate the latter to the prevailing operating conditions, in particular, for instance, to produce a larger or smaller pushing force or pulling force.

It is yet another object of the present invention to provide an electromotive adjusting device, wherein, on the one hand, a drive magnet-arrangement is disposed axially adjacent the electric motor, as a type of a structural self-contained unit formed preferably like a disk structure, which drive magnet-arrangement is disposed within a main outer housing of substantially cylindrical shape, and affecting the spindle nut and adjustable and/or controllable relative to the maximum push or pull. On the other hand, a magnet brake is connected with the drive magnet arrangement in axial direction and likewise constituting a particular structural unit, whereby each of the structural units has a separate housing or the like, which housings are connected with each other by means of axial, laterally disposed securing bolts mounted in the main outer housing.

It is also a further object of the present invention to provide an electromotive adjusting device, wherein the spindle nut is disposed coaxially with and in front of the rotor, and extends into the range of the housing cover and disposed opposite the rotor and mounted in the housing cover, and in addition, the spindle nut can carry on its periphery one or a plurality of spindle nut drive bodies, which are disposed on the spindle nut and can be coupled with the latter for joint rotation and/or rigidly mounted thereon.

It is also still another object of the present invention to provide an electromotive adjusting device, wherein the conventional spring assemblies are replaced by the proposed magnet arrangement, so that the pulling force of a magnet becomes effective instead of the force of the spring assemblies. By replacement of the mechanically operative friction brake by a likewise magnetically operated brake arrangement, a retaining of the spindle nut is achieved in any position. The undesirable heat formation of the motor, which occurs in the known arrangement, is avoided, since the spindle nut is no more disposed within the rotor, rather outside the rotor in a separate housing. Due to the fact that now the spindle only has to be guided through the hollow rotor, the bore of the rotor can likewise be chosen smaller. This arrangement brings about the result that advantageously an enlargement of the useable sheet cross-section of the rotor and a possible reduction of the diameter of the rotor, respectively, and thereby, a possible reduction of the total diameter of the motor results. In this manner, due to the elimination of the additional direct increase of the temperature of the motor, greater permissible switching frequency is made possible, which in addition, is still increased by the better exploitation of the rotor sheet cross-section, due to the reduction of the bore in the rotor.

With these and other objects in view, which will become apparent in the following detailed description, the present invention will be clearly understood in connection with the accompanying drawings, in which:

FIG. 4 is a circuit diagram depicting the axial thrust rotary motor and brake assembly.

Figure 1:
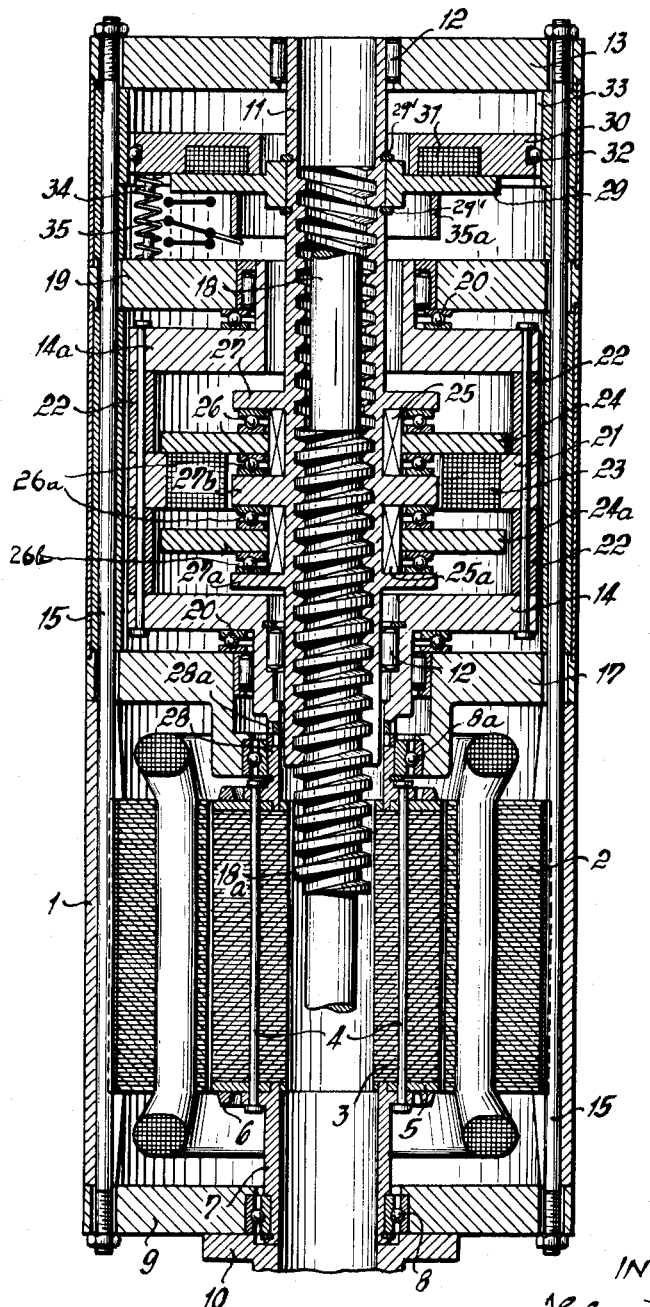
FIGURE 1 is an axial section of the electromotive adjusting device, designed in accordance with the present invention.

Referring now to the drawings, and in particular to FIG. 1, the electric motor designed in accordance with the present invention is shown at the bottom portion of FIG. 1 and comprises a stator 2 with its winding, a rotor 3 and a housing 1. The latter is formed as a single unit with the stator stackings, whereby the housing 1 can be formed, for instance, as an aluminum casting. The rotor 3 has a bore through which a spindle 18 having a thread 18a can freely pass. The rotor sheets are equipped with bores and carry flanges 5 on both sides, which are pressed together already during the manufacture of the rotor body and are retained by short-circuiting rings 6 consisting of aluminum. A hollow body 7 is disposed adjacent one of the flanges 5 and a second hollow body 28 is disposed adjacent the other of the flanges 5. The flanged hollow bodies 7 and 28 are rigidly secured to the rotor by means of a plurality of axially disposed bolts 4 distributed about the periphery of the rotor 3. The hollow body 7 thus constitutes one flanged side of the hollow shaft of the rotor 3 and is mounted in a housing cover 9 by means of a ball bearing 8. A member 10 closes up the ball bearings 8 and the hollow body 7 from the outside and prevents the penetration of dirt into the bearings. The hollow body 28 disposed on the other side of the rotor 3 is likewise mounted in ball bearings 8a in an intermediate housing cover 17. This intermeditae housing cover 17 constitutes simultaneously as the lower housing cover of the adjacent housing, which is closed up by the housing cover 19.

The magnet arrangement is disposed in this housing, by which magnet arrangement determines and limits the push or pull delivered from the device. The upper housing cover 19 constitutes simultaneously the lower housing cover of another housing, which is closed up by the upper housing cover 13. This other housing contains a magnet arrangement, which takes the place of the already mentioned mechanically operating brake arrangement.

A spindle nut 11 extends through these two housings. It is mounted, on the one hand, in the ball bearings 12 disposed in the housing cover 13 and the intermediate housing cover 14. The ball bearings 12 permit a longitudinal displacement of the spindle nut 11. The rotary cylindrical body consisting of the parts 14, 14a, 21 and 22 is retained between the housing flanges 17 and 19 by means of the thrust bearings 20. The annular body 21 includes a ring magnet which has an operating winding 23. The magnet ring 21 is rigidly secured to the disk bodies 14 and 14a by means of spacing bolts 22 and by means of additional bolts (not shown). A coupling 28 formed as a plug axle connects the hollow motor shaft extension 28 with the mentioned rotary cylindrical body consisting of the parts 14, 14a, 21 and 22.

A free-wheel 25 and 25a, respectively, is disposed on the spindle nut 11 between the rings 27, 27a and 27b, 27a, respectively. The free-wheels 25 and 25a have the characteristic, that they lock in one direction of rotation and do not transmit any power in the opposite direction. The free-wheel 25 locks in opposite direction to that of the free-wheel 25a. Each of the two free-wheels 25 and 25a carries a metal disk 24 and 24a, respectively. These disks 24 and 24a re supported relative to the rings 27, 27a and 27b by means of the thrust bearings 26, 26a and 26b.

The upper housing disposed between the covers 13 and 19 contains a brake magnet 30 having a magnet coil 31 and a brake disk 29 which is non-slidably and non-rotatably secured to the spindle nut 11 by means of securing rings 29'. The brake magnet 30 carrying the operating winding 31 is freely movable in longitudinal direction in the groove 33 by means of the balls 32 and is urged by springs 34 equally distributed about its periphery into its resting position towards the flange or housing cover 13. The brake disk 29 carries a cylindrical body 35a rigidly secured thereto, which operates the electric contact 35 during the axial movement of the spindle nut 11 and, thereby, of the brake disk 29.

The entire housing consisting of three parts is held together by axially disposed screw bolts 15 equally divided about the periphery. This structural arrangement of the disks and application of the screw bolts 15 permits a smooth and easy mounting of the parts of the entire unit.

FIG. 1 discloses the resting position of the entire unit, which position has been created, after the upwardly moving spindle 18 has been stopped by exertion of a force greater than its pushing force. Prior to reaching this position, shown in the drawing, a metal disk 24a has been pulled up by the annular magnet 21 and the free-wheel 25a, which is operatively connected with the disk 24a in this direction of rotation, provides the operative connection between the disk 24a, the annular magnet 21, and, thereby, of the spindle nut 11 and the rotor 3. The displacement force of the spindle 18 is determined by the magnetic force exerted by the annular magnet 21 upon the adjacent disk 24a. Since, as assumed, the counter-force, against which the spindle 18 has run, is greater than the magnetic force of the magnet 21, the spindle 18 has assumed a resting position and the counter-force has moved the spindle nut 11 in opposite direction and, thereby, has removed the disk 24a, against the magnetic force of the magnet 21, from the latter. The longitudinal movement of the spindle nut 11 in opposite direction finds its limit by abutment of the disk 24 against the angular magnet 21, whereby it must be stated as a particular characteristic that the disk 24 is not operatively connected with the spindle nut 11 by means of the free-wheel 25, so that only the spindle nut II assumes a resting position by means of the thrust ball bearings 26. Since the disk 24 is not in operative connection in this direction of rotation with the spindle nut 11 by means of the free-wheel 25a, the disk 24 can continue its rotation freely with the rotor, since the disk 24 is subjected to the magnetic force of the annular magnet 23 and retained by the latter, while, on the other hand, the spindle nut 11 itself is in a resting, non-rotating position.

Simultaneously with the axial displacement of the spindle 18, the contact 35 is opened by means of the annular body 35a, which is secured to the brake disk 29, whereby the feeding to the electric motor is stopped by means of the corresponding relay and the electric motor is switched off. Simultaneously, with this switching operation, the annular magnet 31 is excited by feeding of direct current by means of another contact of the motor relay, and the annular magnet 31 pulls itself to the annular body 29 against the force of the springs 34. Since the annular magnet 31 cannot rotate in view of the ball guide 32 moving in the groove 33, the brake disk 29 is prevented from rotation by the annular magnet 31 and the disk 29 retains securely, thereby, the spindle nut 11 and, by means of the latter, the spindle rod 18 in the position given at the point of switching off. Thus, a return run of the spindle 18 is prevented.

It should be mentioned, that the operating mass of the spindle nut 11 is appreciably smaller, in comparison with the known arrangement, in which the spindle nut is directly connected with the rotor of the electric motor, so that, thereby, the remaining run of the spindle 18, due to the moving masses, is appreciably smaller. The brake magnet 31 has now the task, to retain merely the smaller mass. Since only a securing of the magnet 30 on the brake disk 29 is required, the necessity, contrary to the conventional arrangement, of providing a brake ring which reduces the wear, is eliminated, since a braking is caused here only by the engagement friction of two parts, which do not move any more relative to each other.

Since, as already described, the brake disk 30, which carries the brake magnet 31, is pulled towards the disk 29 by the magnetic force of the brake magnet 31, whereby both parts perform none or a very slight rotation relative to each other, which rotation is terminated by the resting position of the spindle 18 and of the spindle nut 11, a particularly advantageous embodiment of the disks 29 and 30 results, if the disks are equipped on their engaging faces with, for instance, radially disposed, corresponding projections and recesses. This corresponds with an embodiment of a plane toothing.

Instead of the multiple toothing, however, individual projections and recesses suffice. These projections and recesses and cavities, which can be formed with sufficient play, thus permit a slight rotation of the two faces relative to each other, prevent, and this is the purpose, that the disk 29 can rotate relative to the magnet disk 30, in spite of the friction between the disks 29 and 30.

It is apparent, that now the magnetic force of the magnet 31 can be lower, since the corresponding projections and cavities prevent a relative rotation. This rotation is possible only, after the annular magnet 30 lost its current feed and is urged into its resting position by the pressure springs 34. In order not to disturb the decoupling process of these two disks by the friction of the engaging projections and cavities, the latter are formed suitably similar to the teeth of a gear, that means, the projections are stronger at their base and formed conically towards their apex, whereby the apex points can be flattened, as in a tooth-gear and the cavities may be formed in complementary manner.

Contrary to the known arrangement, the time which is required for the rotor to come to a standstill jointly with the annular body arrangement 14, 14a, 21 and 22 coupled thereto is here of no significance. In the previously known arrangement, the spring assemblies and the mechanical brakes had to assume the entire moving mass of the rotor together with the spindle nut. As a consequence, a time period for stopping the displacement procedure resulted, which was not clear and could not be short enough. The separation of the spindle nut 11, having now a smaller mass, from the much larger masses of the rotor with the housing 14, 14a, 21 and 22 coupled thereto, upon surpassing the pulling or pushing force, permits a much more exact and shorter time period for stopping the spindle 18, since the main moving masses are separated from the spindle nut 11 and can freely run out at the moment of surpassing the highest pressure force.

Within the sense of the previously made statements concerning the formation of the brake magnet system, it is of advantage and constitutes an appreciable improvement of the magnet arrangement serving the transmission of the forces, when also the disks 24 and 24a on their faces opposite the annular magnet 21 and also the annular magnet 21 on both opposite faces, are equipped with projections and cavities equally divided about their periphery such, that a certain tooth-engagement takes place between the disk pulled by magnetic force and the annular magnet 23. The toothing prevents a relative movement between the pulled-on disk and the annular magnet 23. Here is, thus, also a pulling force of the magnet required, which can be chosen relatively smaller than required for disks with smooth engaging faces, since the relative movement of the two disks is prevented by the projections and cavities.

If, as described above, the pushing force of the spindle rod 18 is overcome by the counter force, a displacement movement of the spindle nut 11 takes place and the disk held by the brake ring 21 is moved away in axial direction from the brake ring 21 by the spindle nut 11 over the thrust bearings 26.

The projections and cavities which are formed similarly to a normal gear arrangement and already described in connection with the brake system, bring about that the disk 24a, which is not operatively connected then over the free-wheel 25a, is pulled up by the magnetic force, such that the corresponding projections and cavities of the opposite faces engage each other, since the disk 24a can perform a relative movement to the annular magnet 21.

It is, by all means apparent and for this reason not particularly shown in FIG. 1, that the winding 23 of the annular magnet 21 can be fed with direct current by means of slip-rings (not shown). The direct current, required for the feeding of the annular magnet 21 with its winding 23 and also for the feeding of the annular magnet 30 with its winding 31, is received in a simple manner, for instance, by connecting the windings between two phases of the three-phase network, whereby, for obtaining direct current, a four-way metal rectifier can be used. In this case, it is assumed, that the driving motor is a three-phase motor. In case, however, a direct-current motor is used as the driving motor, then the feeding of the magnet windings with direct current is easily achieved. It is not necessary to mention in particular, that the motor can be also an A.C.-D.C. or an A.C. motor. If a resistance is disposed in the direct current circuit feeding the magnet winding 23, the magnet force of the annular magnet 21 can easily be controlled by increasing or reducing the resistance. The size of the magnetic force of the magnet 31 is a direct measure for the greatest pushing or pulling force, which can be exerted by the spindle 18.

Thus a possibility is provided to render controllable likewise the pushing or pulling force of the spindle 18 by controlling the current intensity of the magnet. It is to be understood, that this control can be made arbitrarily manually, for instance, by changing the resistance, as well as by an automatic control of the resistance value. The control of the magnetic force can also be brought about, for instance, automatically by the object to be moved. It can be made dependent also upon any other influences in accordance with the possibilities of the control technique. It is, for instance, also thinkable to control the magnetic force in dependency upon the current intensity of the driving motor and to achieve with increasing reception of current, for instance, a larger or smaller magnetic force.

As it can be ascertained from the description of the operation and as can also be obtained from FIG. 1, which discloses the device in the position, in which the counter pressure is larger than the pressure exerted by the spindle 18, so that the spindle 18 is switched off and remains still, by surpassing the magnetic force upon the disk 24a, it is not possible by all means to achieve a further movement of the spindle 18 against the larger counter-pressure force upon renewed switching on of the motor in the same direction of rotation. In order to achieve a renewed start of the spindle 18 against this larger counter-pressure, with the attempt to overcome the latter, it is, therefore, necessary to switch on this motor at first in opposite direction, so that the disk 24, now engaging the annular magnet 21, is operatively connected and the spindle 18 performs a return movement. It is then necessary that the spindle 18 performs the return movement to an extent that it finds its natural abutment, which is determined by the length of the thread spindle. If the spindle 18 moves up to this position, and engages its abutment, then the disk 24 is released from the annular magnet 21 and the disk 24a is brought again into engagement with the annular magnet 21 by the axial movement of the spindle nut 11. Now it is possible again, to permit rotation of the motor in the original position and to start the spindle 18 against the mass to be moved.

As can be recognized without any difficulty from the modus of operation, this case is present only then, when the counter-pressure of the spindle 18 is larger than the maximum pressure, which the spindle can absorb. In all other cases, in which the object to be moved requires a smaller pressure than it can be exerted as a maximum by the spindle 18, it is possible without difficulty to retain the spindle in any position, since the magnetic force of the magnet is not surpassed. The spindle 18 is then, in turn, secured by the brake magnet 30 in this position in which it is switched off, which brake magnet 30 is pulled to the annular plate 29, and thus arrests the spindle 18.

Figure 2:
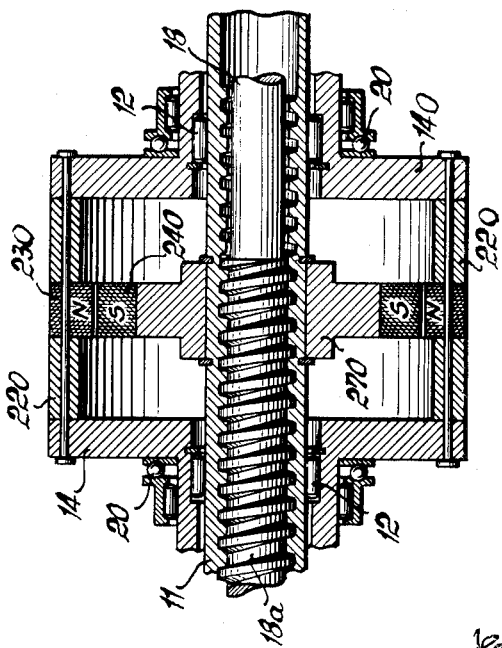
FIG. 2 is a fragmentary axial section of another embodiment of the present invention.

Referring now again to the drawings, and in particular to FIG. 2, another embodiment of the present invention is disclosed, which permits to receive the counter-pressure elastically and which does not lead directly to a switching-off of the motor with increasing counter pressure. In the embodiment shown in FIG. 2, no more two annularly formed parts 24 and 24a are present which are connected with the spindle nut 11 by means of oppositely operating free-wheel locking means, rather a part 270 is provided, which is disposed non-displaceable and non-rotatable by means of safety rings rigidly on the spindle nut 11. This part 270 is likewise an annular disk, which carries on its periphery divided, for instance, alternately north and south poles of a permanent magnet system. Likewise divided north and south poles are disposed opposite thereto with small air slots, which north and south poles are formed either as permanent magnets, or as individual electromagnets.

Upon knowledge of the operation of the embodiment, as it has been disclosed in connection with FIG. 1, it is clearly understood without any difficulty, that the part 270, upon surpassing of a predetermined pressure, which is exerted by the spindle 18, the spindle nut 11, as well as the magnet system secured thereto immovably and non-rotatably moves out on the disk 270 from the center position either towards the right or towards the left, depending upon the direction of movement of the spindle 18.

If, however, the disk 270 with the magnets disposed thereon moves out, then the operative connection between the body consisting of the disks 140 and 220 and the magnet system 23 is weakened, which body is coupled in the previously described manner with the rotor. By this weakening of the operative connection, the torque transmitted from the motor over the system 140, 230 to the disk 270 is smaller. If the disk 270 moves by the counter-pressure into the extreme right or left position, then the transmitted torque is at its lowest value and the driving electric motor assumes correspondingly a small output.

If the counter-pressure disappears for any causes, then the disk 270 is pulled again into its center position and the spindle 18 operates again with its full power. By this arrangement, in accordance with FIG. 2, a pressure elastic spindle 18 is obtained, which does not require that the motor is to be switched off upon reaching the greatest pressure, rather the motor can freely continue, while the torques transmitted in both directions of rotation over the magnet system, if the counter-pressure becomes too great, reduce themselves correspondingly such, that the motor does not run anymore with its normal load and for this reason, thus can run through. By this arrangement, the magnet brake 30 with the disk 29 and the pair of contacts 35 would be eliminated.

In addition, with this arrangement also the possibility exists, to provide a tooth-engagement between the disk 270 and the body 230. This gearing can be arranged again with sufficient play and causes that now the magnets on the outer and inner periphery of the two parts can be formed weaker, since in this arrangement, the torque is transmitted by the loose toothing. Since upon resting of the spindle rod 18, the inner disk 270 is moved out in axial direction from this toothing, due to the displacement of the spindle nut 11 the toothing of these two parts is suitably formed such, that it causes a slight moving out of the teeth relative to each other by, for instance, providing a ball-shape for the teeth of the disk 270, whereby the inner teeth of the body 230 have straight flanges, namely ball-shaped and straight seen in axial direction. It is also possible, for instance, to provide slide balls instead of the inner toothing in the body 230, as already shown as balls 32 running in a groove 33 in FIG. 1.

Figure 3:
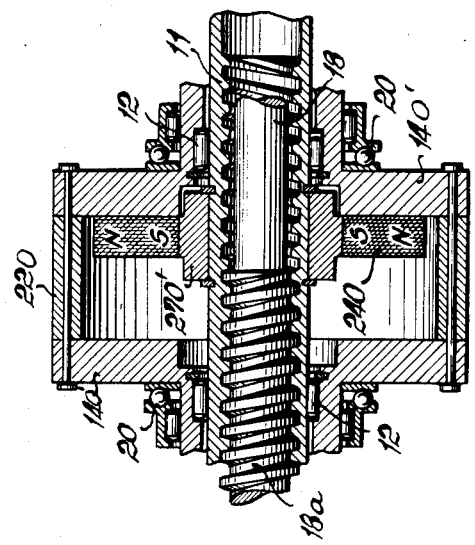
FIG. 3 is a fragmentary axial section of still another embodiment of the present invention.

Referring now again to the drawings, and in particular to FIG. 3, still a further embodiment is shown, which likewise does not depend on the use of two oppositely locking free-wheels. In this embodiment, likewise only one disk 270′ is provided, which is connected with the spindle nut 18, for instance, by means of securing rings immovably and non-rotatably. This disk 270′ carries, contrary to the disk 270 in FIG. 2, now magnets distributed over its periphery, which can be permanent magnets, as well as electro-magnets, since it is clearly conceivable to feed the required direct current to the rotating disk by corresponding slip rings. This method of feeding of current to a rotating body, which is possible and known, is not shown in FIG. 3 for reason of simplicity. It is also possible to make the disk 270′ of soft iron only and to dispose the magnets in the housing 140′. These magnets can likewise be either permanent magnets or electro-magnets, whereby, here again the current is fed thereto by means of particular slip-rings, an expedient likewise not shown in the drawing.

The transmission of the torque of the coupled electric motor by the members 14 and 22 to the spindle 18 by means of the spindle nut 11 is brought about, in the same manner as indicated in connection with the embodiment of FIG. 1, by the force with which the disk 270 engages the housing 140, whereby one of the two last-mentioned members carries the magnet system. In a manner, similar to the arrangement of the embodiment of FIG. 1, in the embodiment diclosed in FIG. 3, upon surpassing of a predetermined counter-pressure, the spindle 18 comes to a rest and the spindle nut 11 performs a return movement in longitudinal direction, whereby the disk 270 is released from the housing 140. If, at the same moment, the pair of contacts 35 is opened, in the same manner as shown in FIG. 1, by the longitudinal movement of the spindle nut 11, then the electric motor losses its feed of current at the same moment by the opening pair of contacts, in the previously described manner. The motor, which now runs out, will come to a standstill, when the released disk 270′ abuts the other end wall of the housing 140′. Due to the rather high transmission ratio between the number of revolutions and the speed of the spindle movement, the motor looses so much of its speed in the meantime, that the movement of the disk is slowed up and does not run up any more with full speed toward the opposite end wall of the housing 140'. It is thus not necessary to provide here a particular wear reducing brake.

This embodiment, according to FIG. 3, is particularly suitable for motors with a low kinetic energy and smaller output, that means for displacement devices of the described type with low pressures. As in the two previously described embodiments, it is also possible in the embodiment according to FIG. 3, to equip the disk 270' and the end walls of the housing 140' with a toothing, as already described in connection with FIG. 1.

Referring now again to the drawings, and in particular to FIG. 4, a circuit diagram is disclosed, in order to indicate the operational control of the present axial thrust rotary motor and brake assembly. As clearly shown in FIG. 4, the motor winding is disposed in a star arrangement. The direct current magnet provided for the operation of the brake is likewise disclosed in the circuit. The coil 31 and the magnet 23 which constitutes the magnetic overload coupling and likewise excited by direct current and also the electric contacts are set in the circuit. A rectifier and a swing contact which operates the forward and return stroke of the spindle, the rectifier providing the feed of the two magnet coils from the network are also disclosed.

It should be added that in the motor feed and in particular in the phase T, out of the phases R, S and T, a transformer-like transmitter is provided, which operates as rotating adjustment device M of conventional structure, the degree of rotary displacement corresponds with the current which the motor receives. A mechanical coupling, shown in dotted lines, is disclosed in connection with the device M, which varies the resistor W corresponding to the position of the device M. Due to the variation of the resistor W, the direct current excitement of the magnet 23 is changed; and in particular in dependency upon the current input of the motor, and thereby simultaneously also in dependency from the load on the spindle. The greater or lesser mechanical load causes a correspondingly greater or smaller current feed to the motor. The current feed results then in a correspondingly stronger or weaker adhering force of the magnetic overload coupling arrangement either in the same direction or in the opposite direction by means of the device M and the resistor W controlled thereby.

While we have disclosed several embodiments of the present invention, it is to be understood that these embodiments are given by example only and not in a limiting sense, the scope of the present invention being determined by the objects and the claims.

We claim:

1. An electromotive adjusting device including means for transforming the rotary motion of a rotor of an electric motor into an axial linear pushing or pulling movement of a spindle adjusting rod secured against rotation, comprising
   a main outer housing,
   an electric motor mounted in said main outer housing, and comprising a rotor and a stator surrounding said rotor,
   a spindle nut coaxially disposed relative to and operated by said electric motor,
   a spindle adjusting rod threadedly received in said spindle nut,
   a magnet brake operatively connected with said spindle nut,
   a drive magnet member disposed axially adjacent said electric motor within said main outer housing, and affecting said spindle-nut and controllable for the maximum push and pull, respectively,
   said drive magnet member constituting a disk-like first structural unit,
   said magnet brake being disposed axially adjacent said drive magnet member and forming a second structural unit, and
   a plurality of axially and laterally disposed securing bolts mounted in said main outer housing.

2. The electromotive adjusting device, as set forth in claim 1, which includes
   a hollow flange member disposed on each end face of said rotor,
   a plurality of securing bolts extending axially through said rotor, connecting said hollow flange members and centering the latter on the end faces of said rotor,
   one of said hollow flanges is mounted in said housing cover disposed on the side of said rotor,
   the other of said hollow flanges is formed as a plug axle,
   ball bearings supporting said hollow flanges in order to position axially said rotor, and
   said rotor having an inner diameter slightly larger than the outer diameter of said spindle adjusting rod.

3. The electromotive adjusting device, as set forth in claim 1, wherein
   said spindle nut is disposed axially adjacent said rotor,
   said main outer housing has covers at its opposite ends axially spaced apart from each other,
   said spindle nut extends into the range of said housing cover disposed remote from said rotor and is mounted therein, and which includes at least one driving body carried on the periphery of said spindle nut, and
   said driving body being mounted on said spindle nut for joint rotation therewith.

4. The electromotive adjusting device, as set forth in claim 3, which includes
   coupling means for releasably connecting said driving body with said spindle nut.

5. The electromotive adjusting device, as set forth in claim 3, wherein
   said driving body is rigidly secured to said spindle nut.

6. The electromotive adjusting device, as forth in claim 3, wherein
   said driving body causing the transmission of forces between said rotor and said spindle nut comprises substantially a rotary-symmetrical body disposed within a two-part housing separated from said rotor,
   a magnet carried by said body and having plug means on the rotor side,
   one of said hollow flanges is mounted in said housing cover disposed on the side of said rotor,
   the other of said hollow flanges is formed as a plug-axle,
   said plug means cooperating with said plug-axle,
   said two parts of said two-part housing comprises two end disks and a center disk simultaneously carrying said magnet, and
   said disks being interconnected by axial securing bolts.

7. The electromotive adjusting device, as set forth in claim 6, wherein
   said drive magnet consists of a plurality of permanent magnets equally distributed about its periphery.

8. The electromotive adjusting device, as set forth in claim 6, wherein
   said drive magnet consists of an iron disk and a winding within said disk,
   said winding being excited by direct current, and
   collectors for feeding the winding exciting current to said winding.

9. The electromotive adjusting device, as set forth in claim 6, wherein
   said drive magnet has at least one operating face, and
   said operating face has a plurality of projections and cavities equally distributed about its periphery.

10. The electromotive adjusting device, as set forth in claim 1, which includes a free wheel drive axially secured and disposed on each side of said drive magnet on said spindle nut, as well as transmitting torques in one direction only, a rotary-symmetrical iron-disk carried by each of said free-wheel drives, said iron-disks being spaced apart from each other such that one of said iron-disks cooperates with said drive magnet, while the other of said iron-disks is axially spaced apart from said drive magnet, thereby determining the axial play of said spindle nut, said iron-disks upon abutment on said drive magnet determining the length of displacement of said spindle nut, and said iron disks having operating faces disposed opposite said drive magnet and said operating faces having projections and cavities cooperating with said projections and cavities of said drive magnet.

11. The electromotive adjusting device, as set forth in claim 10, which includes means for changing the current intensity of said motor in order to provide an automatic control of the magnetic force of said drive magnet.

12. The electromotive adjusting device, as set forth in claim 1, which includes an axially secured iron disk disposed on and coupled for rotation with said spindle nut within the range of the housing adjacent said drive magnet, said magnet brake including a magnet ring cooperating with said iron disk and axially movable in said housing by means of balls, pressure springs retaining said magnet ring in its resting position, and said iron disk and said magnet ring having on their opposite faces complementary and cooperating projections and cavities distributed over their periphery.

13. The electromotive adjusting device, as set forth in claim 12, wherein said magnet ring includes means for exciting the latter with direct current, means for switching on said exciting direct current upon switching off said motor, a switch for said motor and for said magnet ring, and said iron disk having a cylindrical collar cooperating with said switch, for simultaneous switching on of said direct current for said brake magnet.

14. The electromotive adjusting device, as set forth in claim 1, wherein said drive magnet member includes a magnet ring, and which includes means for predetermining the magnetic force of said magnet ring by varying the exciting current therefor.

15. The electromotive adjusting device, as set forth in claim 1, wherein said drive magnet member comprises a permanent magnet having north poles and south poles distributed about it periphery.

16. The electromotive adjusting device, as set forth in claim 1, wherein said drive magnet member comprises an axially secured drive iron disk disposed on and coupled for joint rotation with said spindle nut and an outer magnet ring, and said iron disk has north poles and south poles of a permanent magnet disposed alternately about its periphery.

17. The electromotive adjusting device, as set forth in claim 1, wherein said drive magnet member comprises electro-magnets forming north poles and south poles disposed alternately about its periphery and excitable by direct current feed by means of slip rings.

18. The electromotive adjusting device, as set forth in claim 1, wherein said drive magnet member comprises an iron disk and a magnet ring surrounding said iron disk, and the inner face of said magnet ring and of said iron disk has complementary toothing engaging each other with play.

19. The electromotive adjusting device, as set forth in claim 1, wherein said drive magnet member comprises an iron disk and a magnet ring surrounding said iron disk, and one of said last-mentioned members has a guide for balls secured in the other of said members.

20. The electromotive adjusting device, as set forth in claim 1, wherein said drive magnet member comprises a body including two rotary-symmetrical iron disks, and distancing bolts retaining said iron disks immovably relative to each other.

21. The electromotive adjusting device, as set forth in claim 1, wherein said drive magnet member comprises a first disk rigidly secured to said spindle nut, a second disk surrounding said first disk, said first disk has permanent magnets distributed about its periphery, and said first disk has at its outer face and said second disk has at its inner face a complementary and engaging tooth formation.

22. The electromotive adjusting device, as set forth in claim 1, wherein said drive magnet member comprises a rotary-symmetrical drive body including two iron disks spaced apart from each other, and the distance of said iron disks is measured such that upon surpassing the magnetic force of said magnet member upon one of said iron disks and upon displacement of said spindle nut, said electric motor is switched off and causing a slow movement of said magnet member toward the opposite iron disk.

No references cited.

ORIS L. RADER, *Primary Examiner.*